United States Patent [19]
Traylor

[11] Patent Number: 5,623,225
[45] Date of Patent: Apr. 22, 1997

[54] QUADRATURE SIGNAL DEMODULATION USING QUANTIZING AND ACCUMULATING

[75] Inventor: Kevin B. Traylor, North Richland, Tex.

[73] Assignee: Motorola, Inc., Schaumburg, Ill.

[21] Appl. No.: 577,079

[22] Filed: Dec. 22, 1995

[51] Int. Cl.$^6$ .................................................. H07L 27/14
[52] U.S. Cl. ...................... 329/302; 329/306; 375/328; 375/340
[58] Field of Search ................................... 329/300, 301, 329/302, 303, 304, 305, 306, 310; 375/324, 328, 340

[56] References Cited

U.S. PATENT DOCUMENTS

| | | | |
|---|---|---|---|
| 4,799,214 | 1/1989 | Kaku | 370/32.1 |
| 5,128,966 | 7/1992 | Bang | 329/302 |
| 5,162,798 | 11/1992 | Yundt | 341/116 |
| 5,345,188 | 9/1994 | Owen | 329/323 |
| 5,349,353 | 9/1994 | Zrilic | 341/144 |
| 5,448,202 | 9/1995 | Owen | 329/323 |

Primary Examiner—Siegfried H. Grimm
Attorney, Agent, or Firm—Bruce Terry

[57] ABSTRACT

A demodulator (18) which receives digital representations of a received signal converts those signals into analog signals (53) in a pair of multiplying analog-to-digital converters (MDACs) (21, 22) The analog signals are then combined in combiner (26) by subtracting the first analog signal from the second analog signal (54). The summed signal is normalized (55) in quantizer (27). The output from the quantizer (27) is accumulated (56) in an n-bit accumulator (28) as regulated by a clock input (Fclock). The output of the accumulator (28) is used as a programming input (57) to the MDACs (21, 22).

16 Claims, 2 Drawing Sheets

QUADRATURE SIGNAL DEMODULATION USING QUANTIZING AND ACCUMULATING

FIELD OF THE INVENTION

The present invention relates, in general, to communication systems and, more particularly, to a method and apparatus for demodulating a received signal.

BACKGROUND OF THE INVENTION

As the data rates of communication systems increase, resulting in higher bandwidths, it becomes more desirable to use direct conversion receivers, baseband filtering, and baseband demodulators. The baseband demodulators for frequency modulation (FM) and pulse modulation (PM) signals are usually complex and implemented by taking the arc tangent of the ratio of the two baseband signals, the in-phase portion (I) and the quadrature phase portion (Q). Alternatively, the baseband frequency can also be detected by differentiating and cross-multiplying the baseband signals. Therefore, there is a need for a demodulator that is less complicated in its design and results in a more economical device.

DETAILED DESCRIPTION OF THE DRAWINGS

Figure 1:
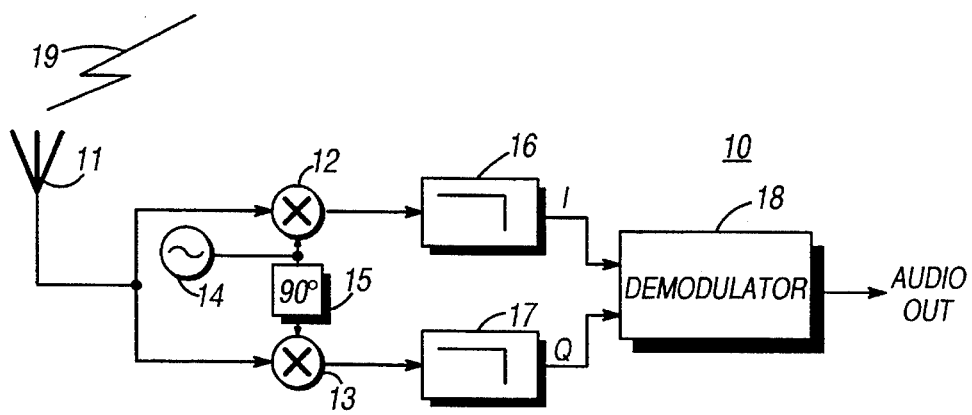
FIG. 1 is a block diagram of a receiver embodying the present invention.

Referring initially to FIG. 1, a block diagram of a receiver, generally designated 10, is illustrated. Receiver 10 consists essentially of an antenna 11, mixers 12 and 13, filters 16 and 17, and a demodulator 18. In receive mode operation, a radio frequency (RF) signal 19 is received at antenna 11. The signal is split into two paths and input into mixers 12 and 13. The other input to mixer 12 is a signal generated by local oscillator (LO) 14. The other input to mixer 13 is also from LO 14, but is phase shifted 90° in phase shifter 15 prior to being mixed with the received signal.

The down converted signals are then output from mixers 12 and 13 to low pass filters 16 and 17, respectively. The output from low pass filter 16 is the in-phase (I) signal and the output from low pass filter 17 is the quadrature phase (Q) signal. The I and Q signals are input to demodulator 18, described in detail below, which provides an audio output signal.

Figure 2:
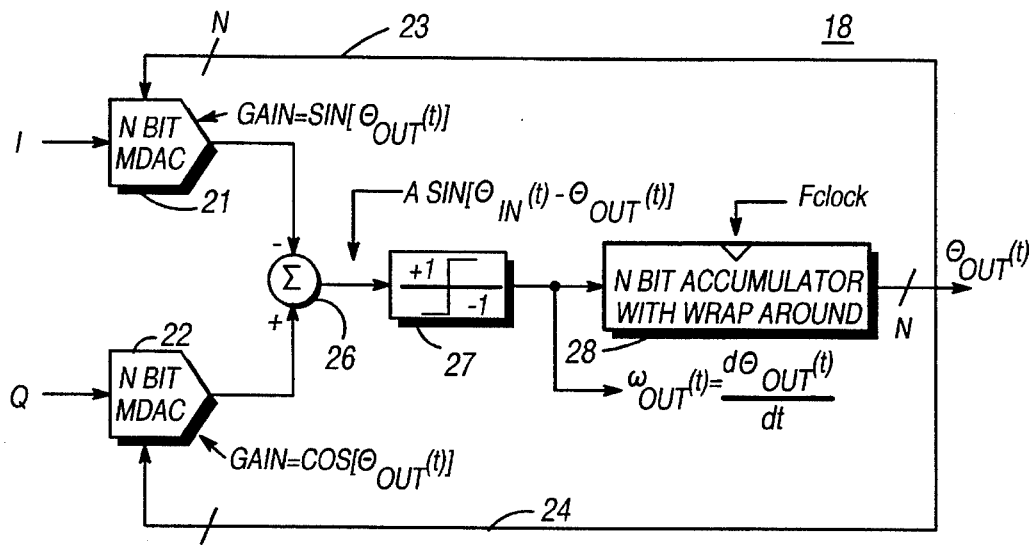
FIG. 2 is a detailed block diagram of the demodulator of FIG. 1.

In FIG. 2, a detailed block diagram of demodulator 18 is illustrated. Demodulator 18 consists of first and second converting means such as N-bit Multiplying Digital-to-Analog Converters (MDACs) 21 and 22. MDAC 21 receives the I signal which is described in equation (1).

$$I = A \cos[\emptyset_{in}(t)] \quad (1)$$

MDAC 22 receives the Q signal which is described in equation (2).

$$Q = A \sin[\emptyset_{in}(t)] \quad (2)$$

where:

A is a variable multiplier;

Ø is the received signal; and t is time.

Each of MDACs 21 and 22 have N-bits of precision and $2^N$ possible gain settings. Therefore, an MDAC with 4-bits of precision will have $2^4$ or 16 possible gain settings. The gain settings are chosen to correspond to $2^N$ equally spaced samples of a sine or cosine wave. MDAC 21 has gain settings that correspond to a sampled sine wave and MDAC 22 has gain settings that correspond to a sampled cosine wave when both MDACs are given the same N-bit programming word. The N-bit programming word is provided along lines 23 and 24, respectively, to a programming input of MDACs 21 and 22.

The resulting outputs, or gains, of MDACs 21 and 22 are defined by equations (3) and (4), respectively.

$$MDAC_g = \sin[\emptyset_{out}(t)] \quad (3)$$

$$MDAC_g = \cos[\emptyset_{out}(t)] \quad (4)$$

Figure 3:
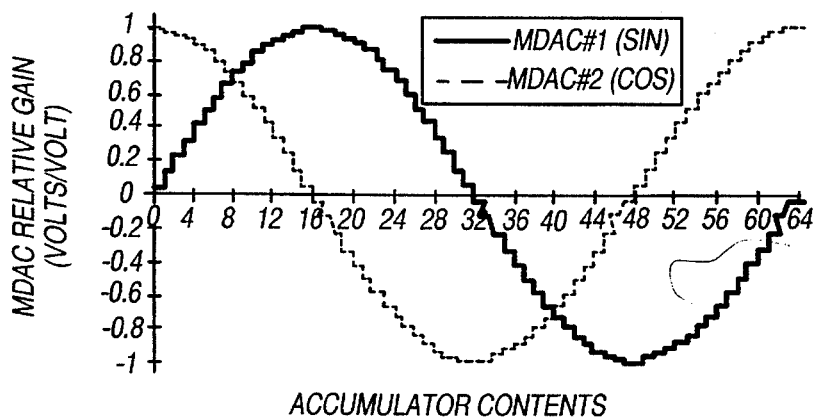
FIG. 3 is a graph of the outputs of the digital-to-analog converters of FIG. 2.

A graphical representation of the gain from MDACs 21 and 22 is illustrated in FIG. 3 for a system where N is 64.

The negative output of MDAC 21 is added to the output of MDAC 22 in summer 26. This provides an output Σ defined by equation (5).

$$\Sigma = A \sin[\emptyset_{in}(t) - \emptyset_{out}(t)] \quad (5)$$

Since A is assumed to be constant, the sign of (5) is determined by the difference between $\emptyset_{in}(t)$ and $\emptyset_{out}(t)$, given that the difference is within the range of ±π. The signal Σ is then input into a quantizing means, such as 1-bit quantizer 27, which will provide a plurality of normalized signals, $\omega_{out}(t)$, defined by equation (6).

$$\omega_{out}(t) = d\emptyset_{out}(t)/dt \quad (6)$$

The output of quantizer 27 is input to an accumulating means, such as an N-bit accumulator with wrap around 28. Accumulator 28 also has a clock input for receiving a clock signal. The clock signal causes the accumulator 28 to be incremented or decremented each clock cycle and results in an output phase that follows the input phase within some quantitization error. Since the maximum rate of change of the output phase is defined by equation (7), the maximum frequency which can be tracked is shown in equation (8).

$$\emptyset_{out}(t) = (2\pi/2^N) * Fclock \quad (7)$$

$$MAX[\emptyset_{out}(t)] = Fclock/2^N \quad (8)$$

The accumulated output signal from the output of accumulator 28 is provided along lines 23 and 24 as the N-bit programming word to MDACs 21 and 22 respectively.

Thus, the circuit design of FIG. 2 represents an economical, less complex, baseband FM and PM demodulator over those currently in use. This is accomplished through use of a sigma delta modulator configured as a phase locked loop.

Figure 4:
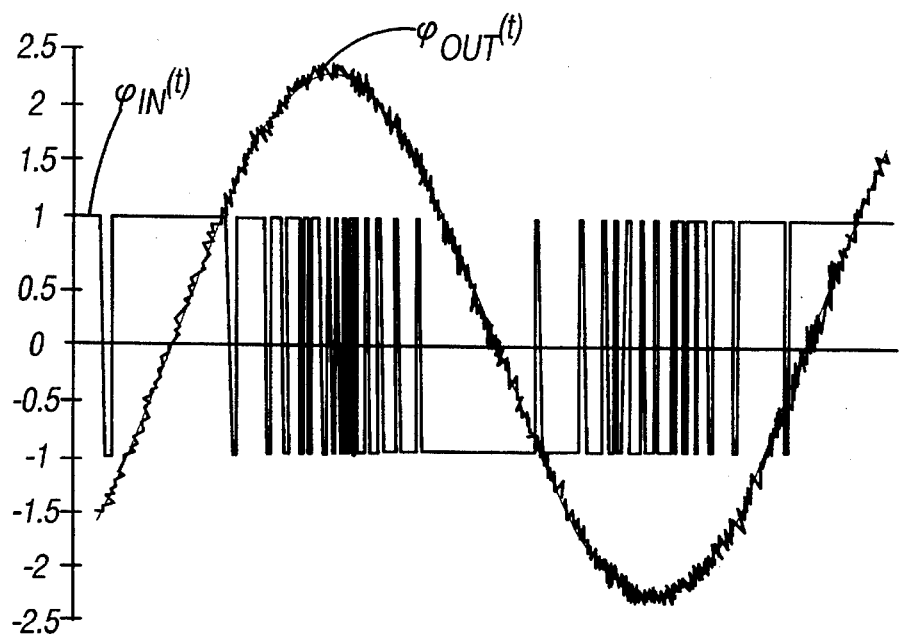
FIG. 4 is a graph of the input and output signals shown with the intermediate normalized signal.

A representation of $\emptyset_{in}$ and $\emptyset_{out}$ is illustrated on the graph of FIG. 4. In the specific example, the $\emptyset_{out}(t)$ is a 6-bit approximation to $\emptyset_{in}(t)$ for sine wave modulation with a peak phase deviation of 0.75π radians. For this example, the sampling rate is 64 times the sine wave frequency. The graph also shows the output of the 1-bit quantizer which is equivalent to the instantaneous frequency. Quantizer 27 toggles between the values of ±1 which is equivalent to ±Fclock/$2^N$. This signal is typically averaged over some time interval so as to provide a more accurate estimation of the real value.

Figure 5:
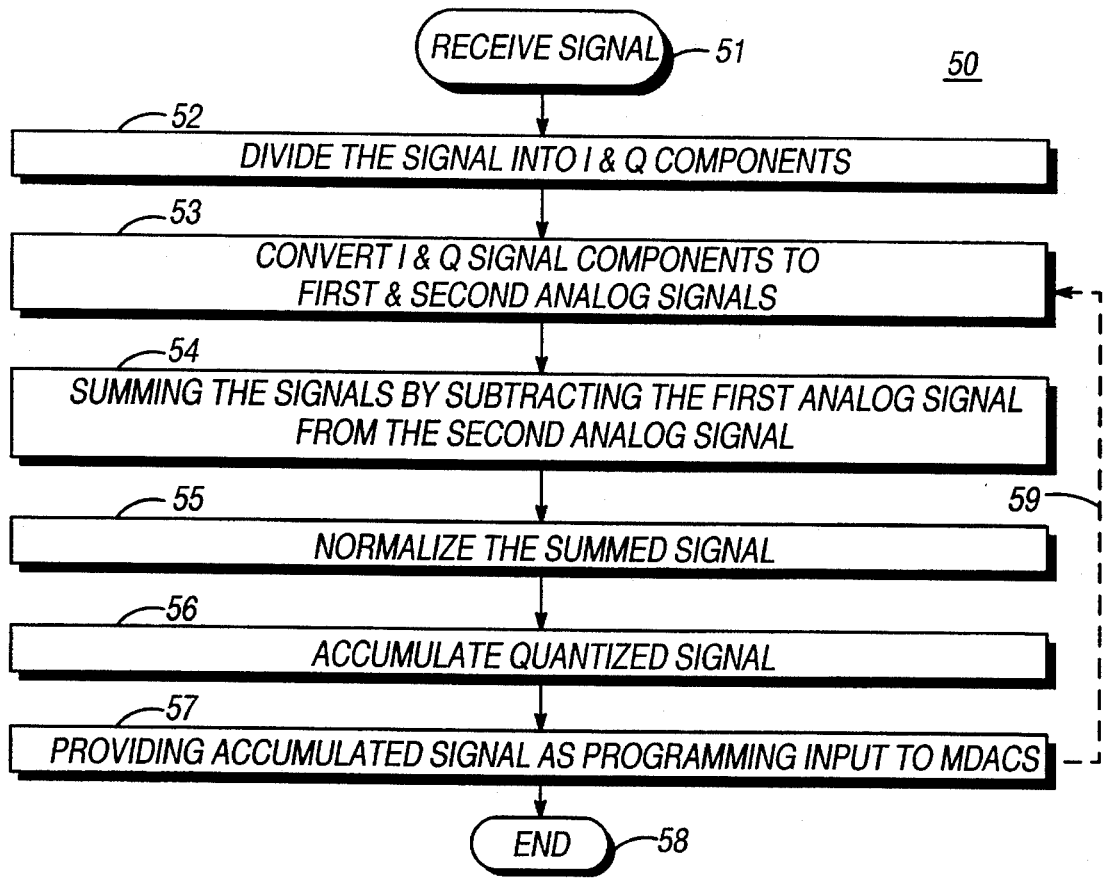
FIG. 5 is a flow chart representing the operation of a demodulator utilizing the present invention.

Referring now to FIG. 5, a flow chart representing the process, generally designated 50, of a demodulator utilizing the present invention is illustrated. Process 50 commences when a signal is received, step 51. The received signal is then processed to generate first and second digital signals representative of the I and Q components, step 52, using first and second digital-to-analog converters. The digital I and Q components are processed in a pair of MDACs to generate first and second analog signals, respectively, step 53.

The analog signals are then summed by subtracting the first analog signal from the second analog signal to provide a combined analog signal, step 54. The summed signal is then quantized providing a normalized signal, step 55. The normalized signal is accumulated in an accumulator, step 56.

The accumulated signal, in addition to being the output, is used as a programming signal which is input, step 57, to the MDACs, as illustrated by line 59. Process 50 then ends, step 58. Thus, a less complicated process over the current demodulator processes is provided.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A demodulator comprising:

first converter means for converting a first digital signal to a first analog signal;

second converter means for converting a second digital signal to a second analog signal;

combining means for combining said first and second analog signals into a combined analog signal;

quantizing means for converting said combined analog signal into a plurality of normalized signals; and accumulator means for accumulating said plurality of normalized signals.

2. The demodulator of claim 1 wherein said first and second converter means comprise multiplying digital-to-analog converters.

3. The demodulator of claim 1 wherein said combining means combines a negative of said first analog signal with said second analog signal.

4. The demodulator of claim 1 wherein said first digital signal is an in-phase portion of a received signal.

5. The demodulator of claim 1 wherein said second digital signal is a quadrature phase portion of a received signal.

6. A demodulator comprising:

a first digital-to-analog converter having an input for receiving a first digital signal;

a second digital-to-analog converter having an input for receiving a second digital signal;

a summer having a first input coupled to an output of said first digital-to-analog converter and a second input coupled to said second digital-to-analog converter;

a quantizer having an input coupled to an output of said summer; and an accumulator having an input coupled to said output of said quantizer, a clock input coupled to receive a clock signal, and an output coupled to a programming input of each of said first and second digital-to-analog converters.

7. The demodulator of claim 6 wherein said first and second digital-to-analog converters are multiplying digital-to-analog converters.

8. The demodulator of claim 6 wherein said summer combines a negative of an output signal from said first digital-to-analog converter with an output signal from said second digital-to-analog converter.

9. The demodulator of claim 6 wherein said accumulator is an n-bit accumulator with wrap around.

10. A method of demodulating a received signal, said method comprising the steps of:

converting the received signal into an in-phase portion and a quadrature phase portion;

converting said in-phase portion into a first analog signal;

converting said quadrature phase portion into a second analog signal;

summing a negative of said first analog signal with said second analog signal to from a combined signal;

normalizing said summed signal forming a normalized signal; and accumulating said normalized signal forming an accumulated signal.

11. The method of claim 10 further comprising the step of providing said accumulated signal as a programming input used in converting said in-phase and quadrature phase components into said first and second analog signals, respectively.

12. The method of claim 10 wherein said steps of converting said in-phase and quadrature phase components into said first and second analog signals, respectively, is performed in a first and a second digital-to-analog converter, respectively.

13. The method of claim 12 wherein said first and second digital-to-analog converters are each a multiplying digital-to-analog converter.

14. The method of claim 10 wherein the step of normalizing said summed signal is performed in a quantizer.

15. The method of claim 10 wherein said step of accumulating said normalized signal is performed in an n-bit accumulator with wrap around.

16. A method of demodulating a received signal, said method comprising the steps of:

converting the received signal into an in-phase digital portion and a quadrature phase digital portion;

converting said in-phase digital portion into a first analog signal in a first multiplying digital-to-analog converter;

converting said quadrature phase digital portion into a second analog signal in a second multiplying digital-to-analog converter;

summing a negative of said first analog signal with said second analog signal to form a summed signal in a summer;

normalizing said summed signal forming a normalized signal in a quantizer;

accumulating said normalized signal in an accumulator receiving a clock signal thereby forming an accumulated output signal; and providing said accumulated output signal as a programming input to each of said first and second multiplying digital-to-analog converters.

\* \* \* \* \*